United States Patent [19]

McCartney et al.

[11] Patent Number: 4,673,625

[45] Date of Patent: Jun. 16, 1987

[54] BATTERY AND HANDLE THEREFOR

[75] Inventors: Charles P. McCartney, Yorktown; Edward W. Susko; Joseph T. Crouse, both of Anderson, all of Ind.

[73] Assignee: General Motors Corporation, Detroit, Mich.

[21] Appl. No.: 892,626

[22] Filed: Aug. 4, 1986

[51] Int. Cl.⁴ .............................................. H01M 2/10
[52] U.S. Cl. .................................. 429/187; 16/114 R; 16/DIG. 15; 220/94 R; 294/145
[58] Field of Search ................... 16/112, 114 R, 361, 16/DIG. 15, DIG. 24, DIG. 40; 429/187, 122; 24/541, 543, 522; 403/353; 220/94 R, 91; 224/902; 294/903, 145

[56] References Cited

U.S. PATENT DOCUMENTS

| | | | |
|---|---|---|---|
| 897,472 | 9/1908 | Marx | 429/176 |
| 971,876 | 10/1910 | Apple | 429/176 |
| 1,653,579 | 12/1927 | Marko | 429/187 |
| 1,796,343 | 3/1931 | Pierson | 220/94 R |
| 3,093,515 | 6/1963 | Rector | 136/166 |
| 3,894,377 | 7/1975 | Welch | 403/353 |
| 4,029,248 | 6/1977 | Lee | 224/45 F |
| 4,225,265 | 9/1980 | Hooker et al. | 403/353 |
| 4,393,540 | 7/1983 | Yamamoto et al. | 16/114 R |

FOREIGN PATENT DOCUMENTS

| | | | |
|---|---|---|---|
| 627030 | 2/1936 | Fed. Rep. of Germany | 429/187 |
| 1042370 | 9/1966 | United Kingdom | 429/187 |

OTHER PUBLICATIONS

Photograph of East Penn Battery & Handle-Exhibit I.
Photograph of ESB Battery & Handle-Exhibit II.

*Primary Examiner*—Brian E. Hearn
*Assistant Examiner*—Steven P. Marquis
*Attorney, Agent, or Firm*—Lawrence B. Plant

[57] ABSTRACT

An electric storage battery having a detachably secureable, one-piece molded carrying handle pivoted on a pair of mounting knobs integral with the battery container endwalls. A preferred handle comprises a rigid rib-rigidified gripping portion, flexible arm portion extending from the gripping portion to the knobs on the battery container. The arms engage the knobs via flat terminals which permit attachment/detachment to the battery by movement in a direction parallel to the container endwalls and comprise a wall lying inboard the arm and defining a pocket for receiving a head on the knob which wall includes a socket therein for receiving and retaining a stem portion of the knob. Projections at the entrance to the stem-retention zone of the socket define a narrow gate for admitting and retaining the stem in the stem-retention zone.

4 Claims, 20 Drawing Figures

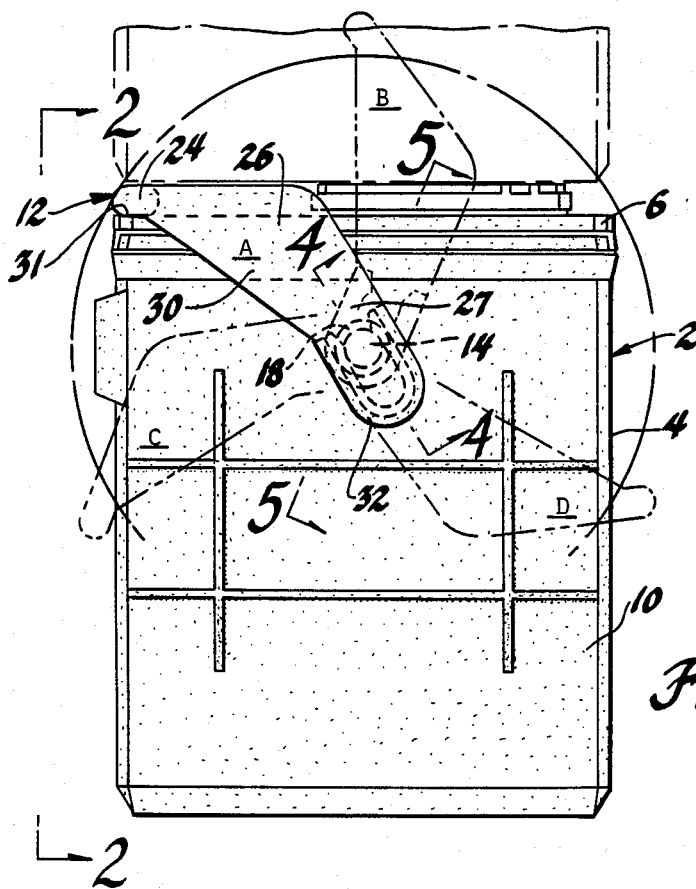
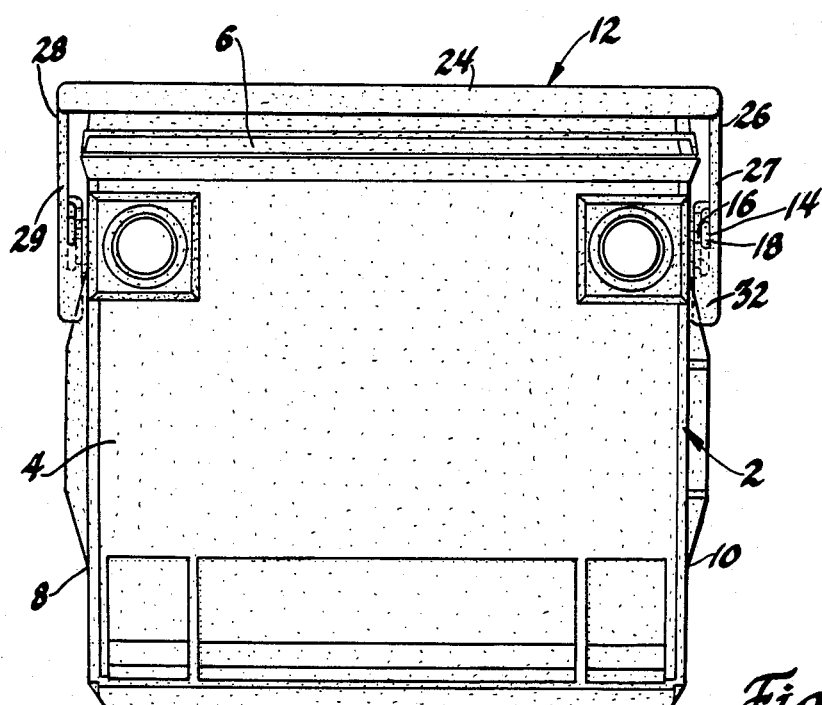
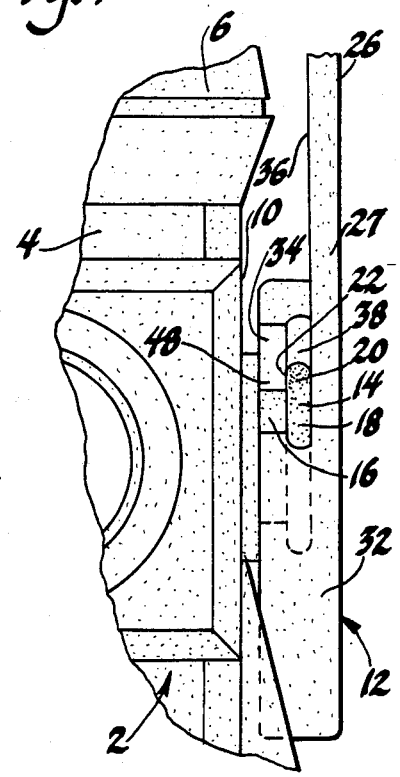
Fig. 1
Fig. 2
Fig. 3

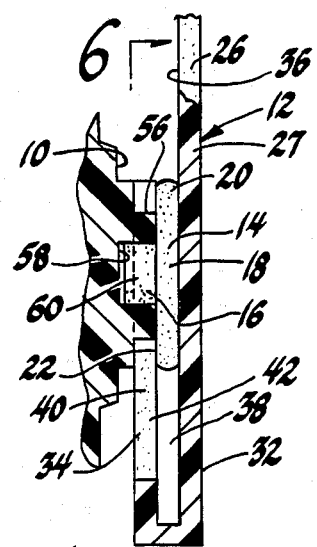
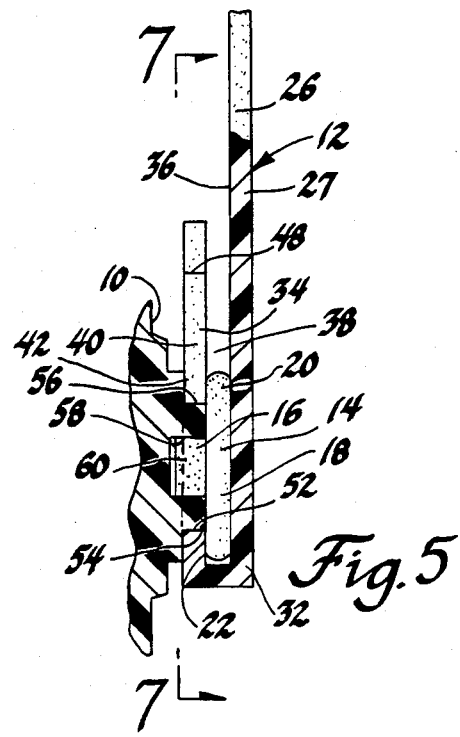
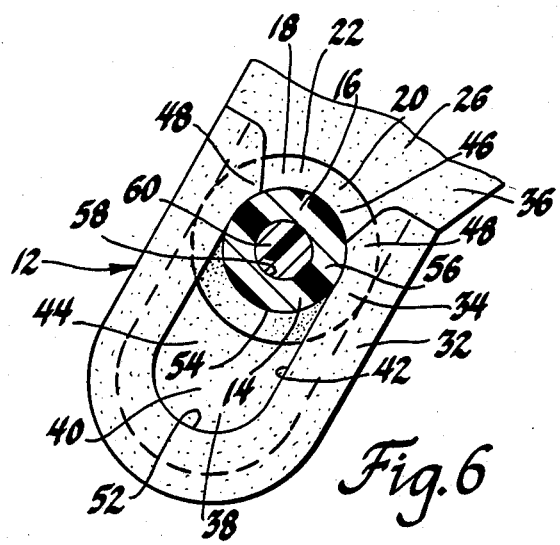
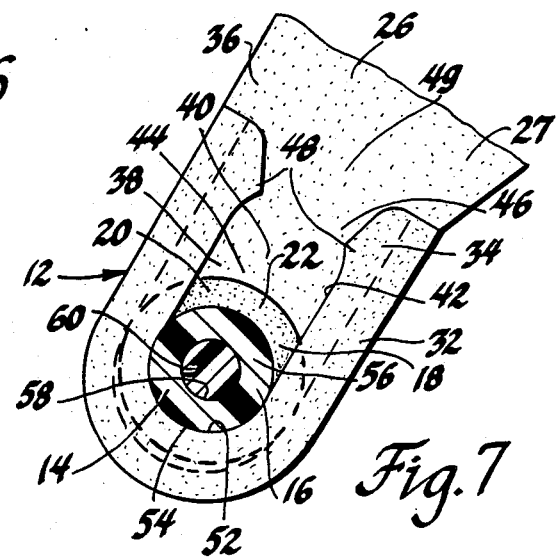
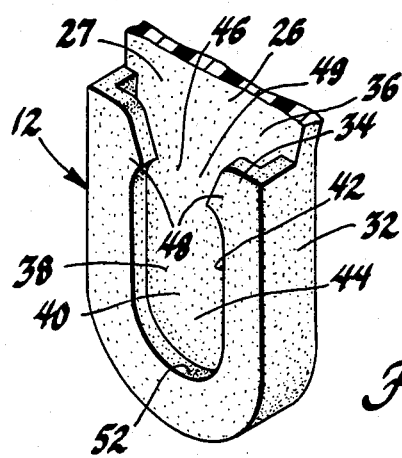
Fig. 4
Fig. 5
Fig. 6
Fig. 7
Fig. 8

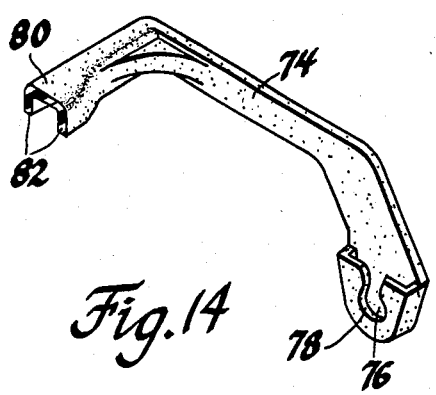
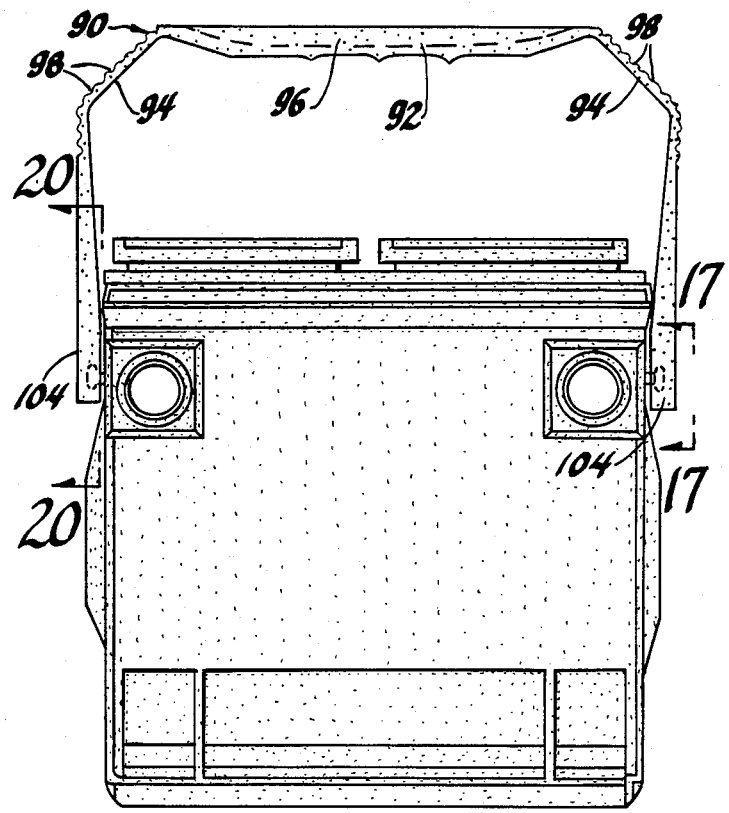
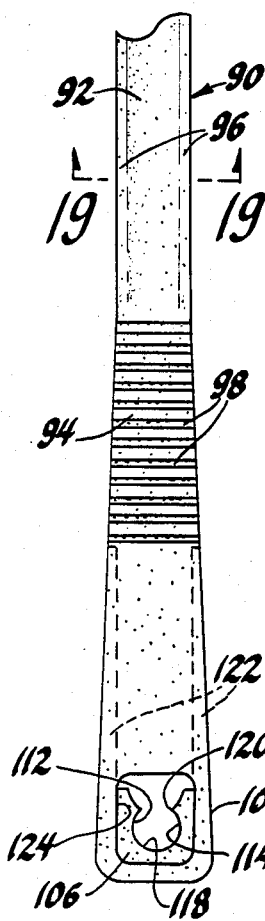
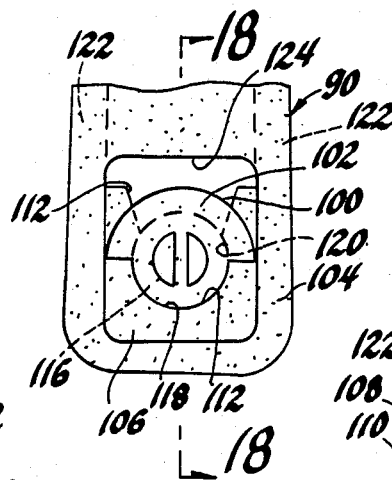
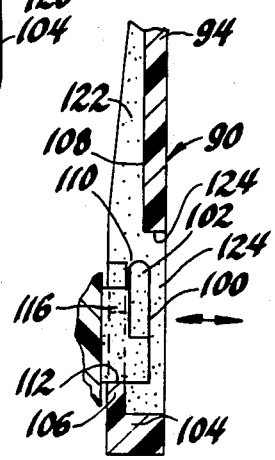
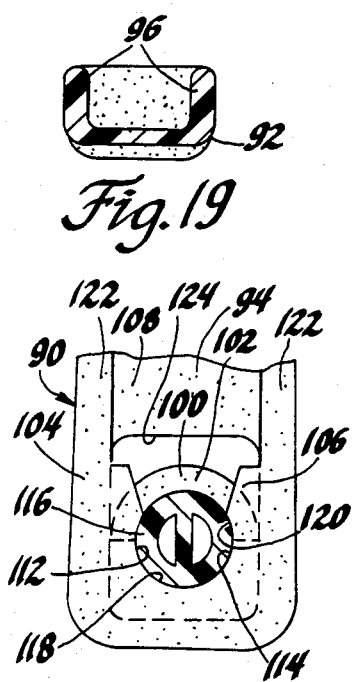

BATTERY AND HANDLE THEREFOR

This invention relates to handles for electric storage batteries.

BACKGROUND OF THE INVENTION

SLI batteries such as are typically used in automotive, marine, recreational or other applications are heavy, cumbersome, usually require two hands for carrying and often must be placed in tight confines or remote locations in a vehicle or storage facility. The desirability of providing such batteries with attachable/detachable handles for facilitating carrying, placement and retrieval of such batteries has long been known and a variety of designs have been proposed.

It is the object of the present invention to provide a unique, one-piece molded plastic handle which is strong, economical to produce, laterally compact, readily displaceable to either side of the battery when not in use, and readily attachable/detachable in tight confines and remote locations. This and other objects and advantages of the present invention will become more readily apparent from the detailed description thereof which follows.

BRIEF DESCRIPTION OF THE INVENTION

The invention comprehends an electric storage battery having a laterally compact handle which is attachable/detachable to the battery by displacement in a direction parallel to the endwalls of the battery and which can pivot between a carrying position above the battery to a storage position alongside the battery. ( Mounting knobs project from the opposite endwalls of the battery container along its centerline. Each mounting knob comprises a head portion spaced from its associated endwall and a cylindrical stem portion which connects the head portion to the endwall. The head portion includes a flange which extends radially outboard the stem so as to provide a face on the underside thereof which confronts the endwall. For ease of molding in conventional battery case molds, the flange will preferably have a semi-circular configuration which extends radially upwardly above the horizontal centerline of the stem. In this regard, there will be no flange extending from the lower half of the head to hang up on the mold doors used to form the endwalls of the battery case.

The handle comprises a one-piece plastic molding having a rib-rigidified, central gripping portion which overlies the battery (i.e., in the carrying position) and arm portions which extend from the opposite ends of the gripping portion into engagement with the knobs on the container via substantially flat terminals on the ends of the arms. The arms are long enough to permit the handle to swing from the overhead carrying position to a storage position alongside the container should the user wish not to detach the handle. A preferred handle is one which is universal in that it may be used with a number of batteries of different lengths. In this regard, a preferred handle comprises a short, rigid, rib-reinforced gripping portion which overlies only the center of the battery and wide, flexible, flat, strap-like arm portions which extend from the gripping portion to engagement with the mounting knobs. A plurality of small transverse grooves molded into the arms along the length thereof between the gripping portion and the terminals provides the requisite flexibility while, at the same time, improving the appearance of the handle. The flat terminals on the ends of the handle's arms result in the addition of little extra width to the battery. Each terminal comprises a wall which lies inboard its associated arm adjacent the container endwall so as to define a pocket on the end of the arm for receiving the head of the knob inwardly (i.e., on the battery side) of the arm. When coupled to the knob, the wall of the terminal engages the face on the underside of the head's flange and together therewith prevents axial displacement of the terminal with respect to the knob. The rim of the terminal wall defines a socket therein which receives and retains the knob's stem. The socket comprises a stem-retention zone and an upwardly opening mouth for the ingress and egress of the stem into and out of the retention zone when the arm is displaced longitudinally in a direction parallel to the battery endwall. A pair of opposed projections extend toward each other from the rim at the entrance to the stem-retention zone so as to define therebetween a gate which is slightly narrower than the diameter of the stem and of such dimension as to prevent the stem from exiting the stem-retention zone under normal conditions of use yet permit manual snapping of the stem into and out of the retention-zone when so desired. The socket and knob are preferably dimensioned such that the weight of the battery is carried by the stem (rather than by the head) pressing against the lowermost portion of the rim defining the socket. In effect, the rim forms a saddle or seat which engages the underside of the stem to provide as short a moment arm on the knob as possible. A preferred terminal in accordance with the present invention has a large window in the end of the arm opposite the socket. The window is substantially coextensive with the opposing terminal wall and permits coring of the pocket during molding by a core which is readily removable from the pocket in the same direction that the mold opens i.e., perpendicular to the flatness of the terminal.

DETAILED DESCRIPTION OF THE INVENTION

The present invention may better be understood when considered in the light of the following detailed description thereof which is given hereafter in conjunction with the several drawings in which:

FIG. 1 is an elevational view of the endwall of a battery and handle assembly in accordance with the present invention;

FIG. 2 is a front elevational view in the direction 2—2 of FIG. 1;

FIG. 3 is an enlarged fragmentary view showing the handle, terminal and mounting knob of FIG. 2;

FIG. 4 is an enlarged, sectioned view in the direction 4—4 of FIG. 1;

FIG. 5 is an enlarged, sectioned view in the direction 5—5 of FIG. 1 of the handle in orientation B;

FIG. 6 is a view in the direction 6—6 of FIG. 4;

FIG. 7 is a view in the direction 7—7 of FIG. 5;

FIG. 8 is a partial perspective view of the inwardly facing side of the terminal of FIGS. 1-7;

FIG. 14 is a perspective view of the arm and terminal of another embodiment of the present invention;

FIG. 15 is a front elevational view of another handle embodiment in accordance with the present invention;

FIG. 16 is a plan of one-half of the handle of FIG. 15 in its as-molded state, before bending and attachment to the battery;

FIG. 17 is an enlarged view in the direction 17—17 of FIG. 15 showing only the handle's terminal portion after assembly to a battery;

FIG. 18 is a view in the direction 18—18 of FIG. 17;

FIG. 19 is a view in the direction 19—19 of FIG. 16; and

FIG. 20 is a view in the direction 20—20 of FIG. 15.

Figure 9:
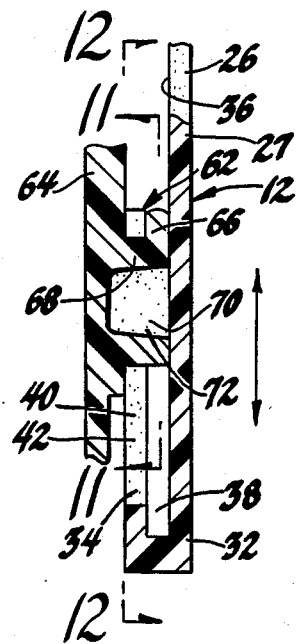
FIG. 9 is a view like that of FIG. 4, showing a preferred knob design.
Figure 10:
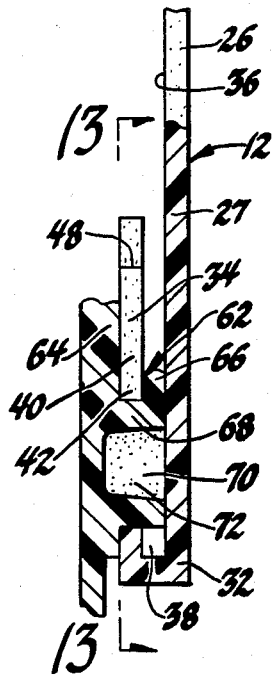
FIG. 10 is a view like that of FIG. 5 showing the preferred knob design.

FIGS. 1-8 depict one embodiment of the invention in relation to a battery container 2 comprising a case 4, a cover 6 and having endwalls 8 and 10 on the opposite ends thereof. A carrying handle 12 is attached at one end to endwall 10 by means of a mounting knob 14 comprising stem 16 and head 18. The other end of the handle is similarly attached to endwall 8. The head 18 nests in a pocket in the handle as will be described in more detail hereafter and includes an annular flange 20 which extends radially outboard the stem 16. The flange 20 has an innerface 22 on the underside thereof for engaging the handle to prevent the handle from lateral disengagement with respect to the battery case (i.e., axially to the stem 16).

The handle 12 comprises a one-piece, plastic molding having a substantially rigid gripping portion 24 and substantially rigid arms 26 and 28 extending from the ends of the gripping portion 24 into engagement with the knobs 14 on the battery container 2. The arms 26 and 28 are made flat so as not to substantially increase the overall length of the battery and made sufficiently wide to provide the requisite strength for carrying the battery. In this embodiment, the arms 26 and 28 have a dogleg configuration (see also FIG. 14) so that the gripping portion 24 is offset from the longitudinal axis of the lower portions 27 and 29 of the arms 26 and 28, respectively, and may accordingly lie flat atop the battery cover 6 along the longitudinal edge 31 thereof as depicted in orientation A (i.e., solid lines) of FIG. 1. In this orientation and when appropriately dimensioned, the gripping portion 24 can serve as a shipping block or spacer/support which permits stacking several batteries (boxed or unboxed) one atop the other, without creating an unbalanced condition in the stack. A reinforcing gusset 30 may be provided to strengthen the handle 12 at the bend in the doglegged arms 26 and 28 so as not to over stress the arms 26 and 28 when the handle 12 is in the carrying position shown in phantom as orientation B of FIG. 1. The arms 26 and 28 are sufficiently long that when the handle 12 is not needed as a shipping block (orientation A) or a carrying means (orientation B) it may be stored out of the way alongside the case 4 as depicted in orientations C or D of FIG. 1.

Each arm (e.g., 26) has a terminal 32 on the end thereof which not only permits pivotal and radial movement with respect to the knob 14 but also allows attachment/detachment of the handle by movement of each arm in a direction parallel to the endwall of the container (i.e., see arrows in FIG. 9) so that even in the most confined spaces the handle may be readily connected to, or removed from, the battery. Each terminal 32 comprises a wall 34 inboard the innerface 36 of the arm 26 and adjacent the endwall 10 of the container 2. The inboard wall 34 defines a pocket 38 inwardly (i.e., on the battery side of) the leg 26 which receives the head 18 of knob 14. A rim 42 of the wall 34 defines a socket 40 in the center of the wall 34 which socket 40 comprises a stem-retaining portion 44 and an upwardly opening (preferably in the direction of the longitudinal axis of the arm) mouth portion 46 to provide for ingress and egress of the stem 16 into/out of the stem-retaining portion 44. The stem retention-zone 44 of the socket 40 is preferably elongated or slot-like which permits the aforesaid radial displacement of the handle 12 with respect to the knob 14 (i.e., the terminal 32 can slide as well as rotate on the knob 14) which permits the handle 12 to assume the several orientations A-D shown in FIG. 1. Opposing slope-sided projection 48 extend from the rim 42 toward each other into the socket 40 and define therebetween a gate 49 which is slightly narrower than the diameter of the stem 16. This gate opening is such as will permit the stem 16 to be manually forced into or out of the stem-retention zone 44 via mouth 46 yet will resist dislodging of the stem 16 from the socket under normal conditions of use. In this regard, manually pressing the stem 16 against the sloped sides of the projection 48 cams the projections 48 apart as the stem 16 passes through the gate 49. Thereafter the projections 48 snap back to their original position and prevent escape of the stem 16 from the socket 40. Reversing the direction of the manually applied force disengages the terminal from the knob. In each case, the engagement/disengagement force is applied in a direction parallel to the endwall of the battery and the arms for easy attachment/detachment of the handles in even the most confined areas of a vehicle.

As best shown in FIGS. 5 and 7, the lowermost region of the rim 42 provides a saddle 52 which engages the underside 54 of the stem 16 to support the battery as close as possible to the endwall 10 and thereby reduce the possibility of breaking the stem 16.

Figure 11:
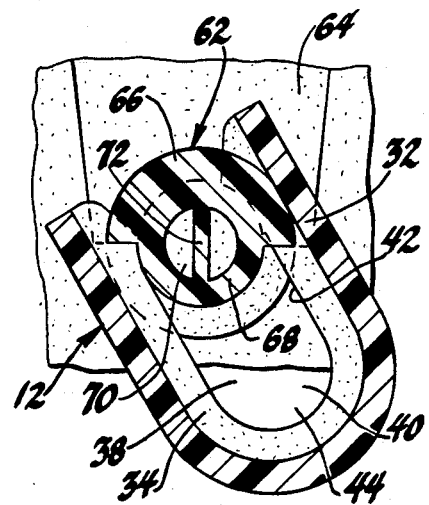
FIG. 11 is a view in the direction 11—11 of FIG. 9.
Figure 12:
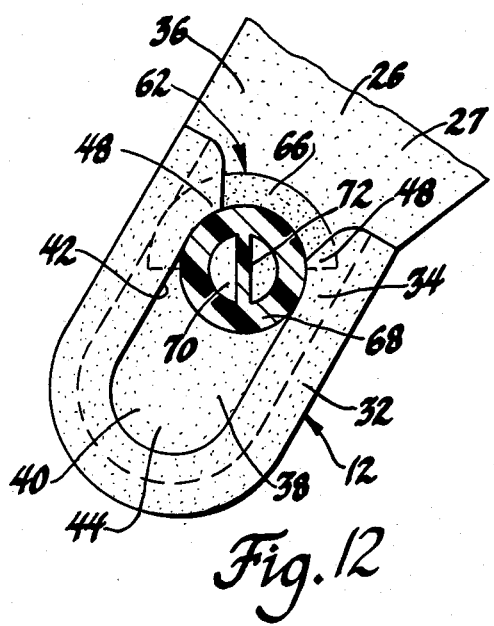
FIG. 12 is a view in the direction 12—12 of FIG. 9.
Figure 13:
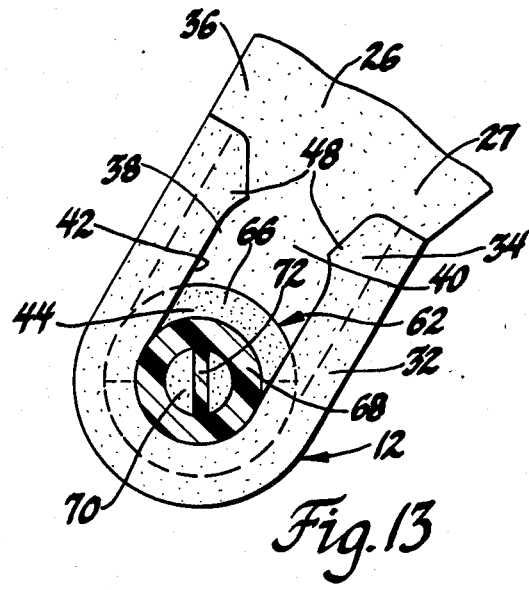
FIG. 13 is a view in the direction 13—13 of FIG. 10.

FIGS. 9-13 are essentially the same views of a terminal and knob assembly as are depicted in FIGS. 4-7 but differ therefrom only with respect to the structure of the mounting knob. In this regard, FIGS. 4-7 show the mounting knob 14 as comprising two parts, i.e. an annular boss 56 molded integrally with the endwall 10 and a separate button fitted into the boss 56 to form the head portion 18. In this regard, the boss 56 includes a central cavity 58 for receiving a projection 60 formed integrally with the button forming the head 18. During assembly, the projection 60 on the head 18 is inserted into the cavity 58 and ultrasonically welded therein to form the knob 14. This two step, knob-forming operation was required to permit the use of conventional battery case molds and still provide a head 18 having a continuous circular flange 20. In accordance with the preferred embodiment shown in FIGS. 9-13, the two-step, knob-forming operation can be eliminated and a flanged, mounting knob 62 molded integrally with the container endwall 64 in a single molding operation using conventional battery case molds. In this regard, the knob 62 shown in FIGS. 9-13 permits the use of conventional battery case molds (i.e., with slideout end doors) by eliminating the portion of the flange which depends from the underside of the knob 62 and would otherwise hang up on the mold doors forming the container endwalls. The remaining upstanding semi-circular flange 66 may be cored (i.e., during molding) from the same mold part that cores the several cell compartments. In accordance with this preferred embodiment, the mounting knob 62 comprises a hollow stem 68 carrying a semi-circular flange 66 which extends radially outboard the stem 68 only from the upper half of the stem 68 (i.e., when viewing the battery in an upright carrying position). A cavity 70 in the stem 66 controls shrinkage of the knob 62 during cooling. A vertical web 72 (see FIGS. 11-13) is preferably provided transverse the cavity 70 to reinforce the stem 68 against collapse or breakage when in use. As best shown in FIGS. 11-13, the semi-circular flange 66 is sufficient, sizewise, to engage a sufficient portion of the wall 34 to retain the terminal in place regardless of the orientation of the handle.

FIG. 14 is a partial perspective view of another embodiment of the present invention similar to that discussed in connection with FIGS. 1-3, but differing therefrom in two respects, i.e., the doglegged arm 74 does not include a reinforcing gusset (i.e., like 30 in FIG. 1) and the stem-retaining portion 76 of the socket 78 in the terminal 32 is circular rather than elongated and conforms substantially to the outside diameter of the stem 16 (FIGS. 1-8) or 66 (FIGS. 9-13). FIG. 14 also depicts the preferred structure of the rigid gripping portion 80 and particularly the use of two parallel reinforcing ribs 82 to provide the requisite rigidity from what would otherwise be too thin of a material.

FIGS. 15-20 depict a universal and most preferred embodiment of the present invention in that the handle shown therein is easily molded, easily stored, aesthetically appealing and a single size may be used with a variety of batteries of different lengths. The handle comprises a one-piece molded strap 90 having a rigid gripping portion 92 and flexible arms 94 extending from the ends thereof to the mounting knobs on the ends of the container. The gripping portion 92 overlies less than the entire length of the battery and is rigidified by a plurality of reinforcing ribs 96 extending the length of the gripping portion. A plurality of grooves 98 molded transverse the length of the arms 94 provide flexibility to the arms 94 and permit the bending thereof where needed to accommodate batteries of different lengths. The arms 94 are made sufficiently long to permit positioning of the gripping portion 92 alongside even the longest battery. A mounting knob 100 having only an upstanding flange 102, like that described in cooperation with FIGS. 9-13, is preferred. Terminals 104 on the ends of the arms 94 each comprise a wall 106 inboard the innerface 108 of the terminal and defining a pocket 110 therein for receiving the flange 102 of the knob 100. A rim 112 of the wall 106 defines a socket 114 receiving the stem 116 of the knob 100. The socket 114 comprises a stem-retaining portion 118 and a mouth portion 120 for ingress and egress of the stem 116 into/out of the stem-retaining portion 118 of the socket. Rails 122 molded on the innerface 108 of the terminal not only stiffen the terminal 104 but serve to guide the knob 100 into place during attachment of the handle to the battery. A window 124 opposes, and is substantially coextensive with, the wall 106 and permits coring the molding of the pocket 110 and socket 114 (if so desired) from the direction indicated by the arrows in FIG. 18. The window 124 also permits ready cleaning and removal of any debris that might otherwise accumulate in the pocket 110 and hinder its effectiveness.

While the invention has been disclosed primarily in terms of certain specific embodiments thereof it is not intended to be limited thereto but rather only to the extent set forth hereafter in the claims which follow.

The embodiments of the invention in which an exclusive property or privilege is claimed are defined as follows:

1. In an electric storage battery including a container having a carrying handle pivotal thereon and detachably secured thereto via mounting knobs projecting from opposite endwalls thereof, the improvement comprising:

each said knob comprising a head portion spaced from a said endwall and a substantially cylindrical stem portion of determined diameter extending between, and in contiguous relation to, said endwall and said head portion, said head portion including a flange extending radially outboard said stem portion;

a surface on the stem side of said flange confronting said endwall;

a handle comprising a one-piece plastic molding having a substantially rigid gripping portion and arm portions extending from the opposite ends of said gripping portion to said knobs, said arm portions having sufficient length to permit positioning of said gripping portion above or alongside said battery as desired;

an innerface on each said arm portion confronting a said endwall;

a substantially flat terminal forming the end of each of said arm portions engaging a said knob, said terminal comprising a wall lying inboard of, and substantially parallel to, said innerface adjacent a said endwall and defining a pocket containing said head, said wall engaging said surface of said flange such as to prevent axial displacement of said terminal with respect to said knob;

a rim of said wall defining a socket in said wall for receiving said stem, said socket having a stem-retention zone and an upwardly opening mouth for the ingress and egress of said stem portion into and out of said zone by movement of said arm longitudinally and parallel to said endwall; and a pair of opposed projections extending toward each other from said rim into said socket and defining therebetween a gate which is sufficiently narrower than said diameter as to permit manual snapping of said stem into and out of said stem-retention zone to engage/disengage said terminal with/from said knob yet retain said stem in said zone in normal use.

2. In an electric storage battery including a container having a carrying handle pivotal thereon and detachably secured thereto via mounting knobs projecting from opposite endwalls thereof, the improvement comprising:

each said knob comprising a head portion spaced from a said endwall and a substantially cylindrical stem portion of determined diameter extending between, and in contiguous relation to, said endwall and said head portion, said head portion including a substantially semi-circular flange extending radially outboard said stem portion in an upward direction when said battery is viewed in a carrying position;

a surface on the stem side of said flange confronting said endwall;

. a handle comprising a one-piece molded plastic strap having a substantially rigid gripping portion overlying less than the entire length of the battery when in a carrying position, and flat flexible arm portions extending from the opposite ends of said gripping portion to said knobs, said arm portions having sufficient length to permit positioning of said gripping portion above or alongside said battery as desired;

an innerface on each said arm portion confronting a said endwall;

a substantially flat terminal forming the end of each of said arm portions and engaging a said knob, said terminal comprising a wall lying inboard of, and parallel to, said innerface adjacent a said endwall and defining a pocket inwardly of said innerface containing said head, said wall engaging said surface of said flange such as to prevent axial displacement of said terminal with respect to said knob;

a rim of said wall defining a socket in said wall for receiving said stem, said socket having a stem-retention zone and an upwardly opening mouth for the ingress and egress of said stem portion into and out of said zone by movement of said arm longitudinally and parallel to said endwall;

a pair of opposed projections extending toward each other from said rim into said socket and defining therebetween a gate which is sufficiently narrower than said diameter as to permit manual snapping of said stem into and out of said stem-retention zone to engage/disengage said terminal with/from said knob yet retain said stem in said zone in normal use.

3. A battery in accordance with claim 2 wherein said flexible arm portions include a plurality of grooves transverse the length of the handle to provide said flexibility.

4. A battery in accordance with claim 2 wherein said terminal includes a window opposite said wall on the other side of said pocket, said opening being substantially coextensive with said wall for coring the molding of said pocket.

* * * * *